(No Model.)
H. L. SULMAN.
PROCESS OF PRECIPITATING PRECIOUS METALS FROM THEIR SOLUTIONS.
No. 576,173. Patented Feb. 2, 1897.
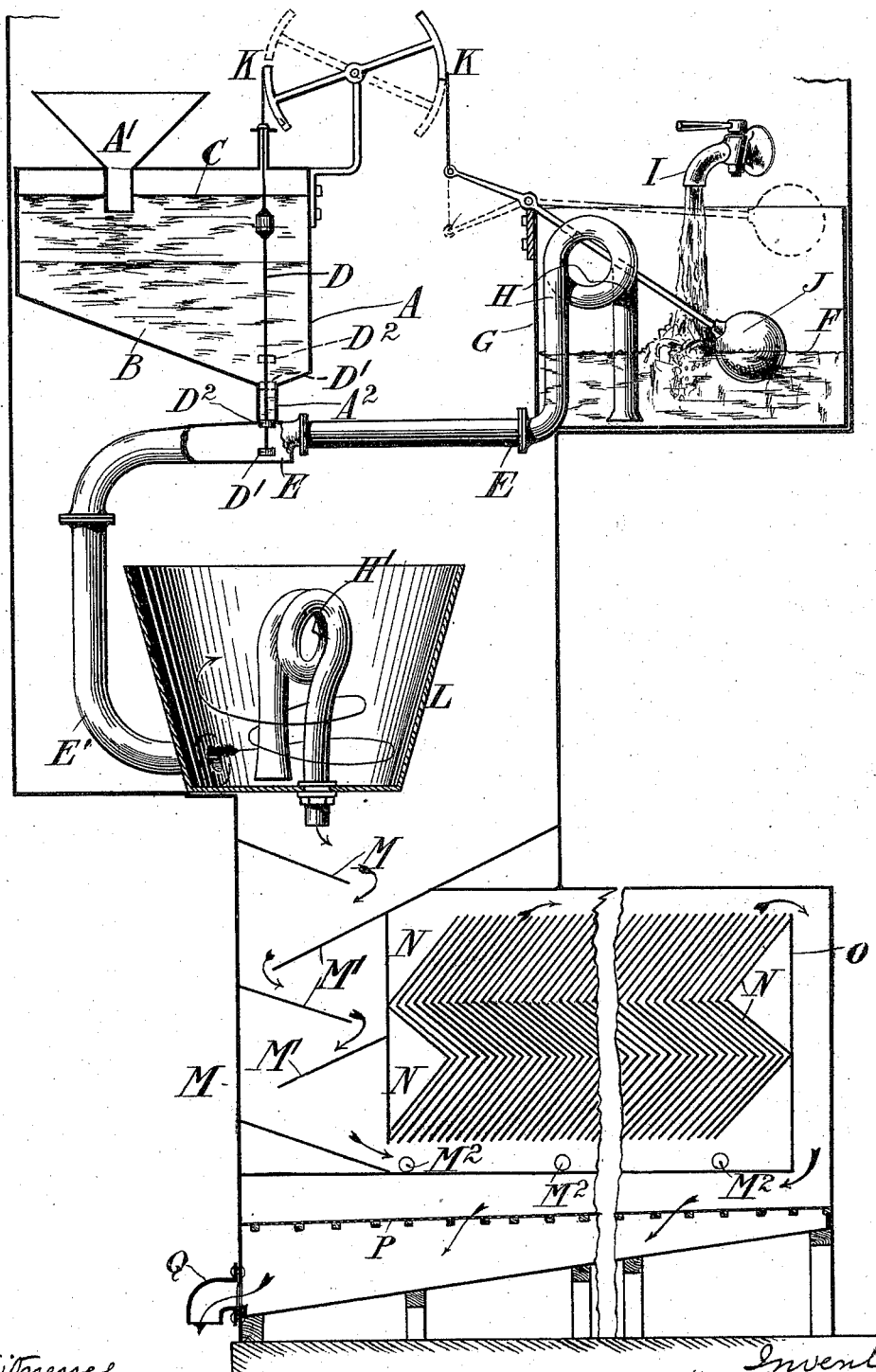

UNITED STATES PATENT OFFICE.

HENRY LIVINGSTONE SULMAN, OF LONDON, ENGLAND.

PROCESS OF PRECIPITATING PRECIOUS METALS FROM THEIR SOLUTIONS.

SPECIFICATION forming part of Letters Patent No. 576,173, dated February 2, 1897.

Application filed February 25, 1895. Serial No. 539,647. (No specimens.) Patented in England February 7, 1895, No. 2,729.

*To all whom it may concern:*

Be it known that I, HENRY LIVINGSTONE SULMAN, a subject of the Queen of England, residing at London, England, have invented certain new and useful Improvements in or Relating to the Precipitation of Precious Metals from Their Solutions, (for which I have obtained Letters Patent of Great Britain, No. 2,729, dated February 7, 1895,) of which the following is a specification.

This invention relates, in the first place, to the precipitation of precious metals generally from their solutions, but particularly to gold and silver dissolved in cyanid solutions, and, secondly, to apparatus which may be employed for carrying this process into practical effect.

The precipitant I prefer to employ for cyanid solutions is the condensed metallic vapors of zinc, technically known as "zinc-dust" or "zinc-fume," as described in an earlier patent. The term "zinc-fume" does not apply to the oxid of zinc produced by the combustion of metallic zinc, but is recognized in the practical art of chemistry as meaning the almost pure metal condensation formed during the distillation of zinc from its ores, and which is as fine as flour. No combustion can possibly take place, or, if so, only to an extremely limited extent, inasmuch as great pains are taken to prevent the access of air during treatment. This product or zinc-fume is sold commercially, and when pure is found to contain at least ninety-five per cent. of metallic zinc, while the remaining percentage is made up of oxid, which it is my purpose to entirely remove or eradicate. I find that even this method is improved in rapidity and efficacy by a preliminary purification of the zinc-fume from the oxid of zinc which may be present.

The first part of this invention is to remove some or all of the oxid of zinc present, so that the solution containing the precious metal may be acted upon by the purified zinc, and this may be effected by digesting the zinc-dust with any reagent that will dissolve the oxid of zinc and leave the metallic zinc unacted upon. Ammonia, ammonium chlorid, and ammonium carbonate all answer this requirement, and if a solution of one of these reagents be mixed with zinc-dust the oxid of zinc will be found to be dissolved, and the purified zinc is then ready to be applied to the solution of precious metals. These three reagents, ammonia, ammonium chlorid, and ammonium carbonate, may also be used in solution to purify zinc in any form, such as shavings or granules, from any adhering oxid of zinc and so render the zinc more efficacious as a means of removing precious metals from their solutions, thus avoiding the necessity of employing freshly-turned shavings of zinc for use in removing precious metals from their cyanid solutions.

Although I have found the three reagents mentioned above fully answer my requirements, it will be understood that other agents may be employed that will purify the zinc-fume from any oxid of zinc present.

The second part of the invention relates to the apparatus which may be employed in recovering precious metals, and particularly gold, from their solutions according to the process above described, and although the apparatus could be employed with other precipitating agents I have particularly designed it for use where zinc is the precipitating agent, and for the present I will so describe it.

In the accompanying drawing I have diagrammatically represented the apparatus, in which I employ any suitable tank or vessel A, which may be provided with a hopper or equivalent A', through which the zinc B and liquor C used in the process of removing the oxid may be passed to the interior of the vessel A, the bottom of which slopes to a point from which extends a tube or pocket A², closed alternately at top or bottom by a suitable valve arrangement, say two valves D' D², carried upon a wire or equivalent D, so that when the bottom of the tube A² is closed the top is opened, and vice versa. The pocket or tube A² opens into a passage or channel E, which receives the gold solution F from another tank or vessel G through a siphon H, the vessel G being supplied with preferably a continuous stream of the gold solution, as conventionally shown by the cock 1, and having a ball-float and lever J, connected by any suitable mechanism, as, for example, the chains and sector-lever K, with the rod D of the valves D' D², the arrangement being such that when the ball-float J drops, say, from the position shown in dotted lines to that indicated in full lines in the drawing the valves D' D² are lowered into the position shown in full lines, so that the charge of zinc dust or fume between the two valves D' D² is allowed to escape into the channel, the valve D² then at the bottom of the pocket preventing any more than this predetermined quantity from entering the channel E.

In operation as soon as the vessel G is full of the gold solution F, with the ball-float J at the top and the bottom valve D' at the top of the pocket A², all as shown in dotted lines in the drawing, the siphon H in the vessel G begins to operate, discharging the contents of the vessel into the channel E. As the vessel G empties, the ball-float J falls and allows the valves D' D² to descend and take with them and discharge into the channel E a quantity of the zinc B equivalent to the capacity of the pocket A², or dependent upon the distance between the valves D' D². The charge from the pocket A² will be of suitable proportions to deal with the charge of gold solution F coming from the vessel G, and is discharged into the channel E, meeting the solution and carried away with it.

From the previously-described apparatus the solution and zinc pass by a suitable pipe or channel E' to a cylindrical or preferably conical vessel L, around which it swirls, as indicated by the arrow as it enters at one side and tangentially, thus effecting a very intimate mixture of the solution and the zinc. This vessel L is provided with a siphon H', which commences to act when the solution in it has risen to the proper level, the siphon discharging the contents of the vessel L into an apparatus or vessel M, provided with a number of inclined baffle-plates M', down which the solution flows, thus effecting a further admixture. It then rises between inclined plates N, placed in series close together, of any suitable material, say with advantage slate, upon which the gold and zinc deposit and slide down to the bottom of the vessel M, while the liquor escapes by the upper part of the vessel and flows over the plate O and preferably through a filter-cloth or other filtering medium P, finally leaving by way of the outlet Q. The liquor then flows into a well or sump, from which it may be pumped for reuse in the process, while the gold or other precious metal or zinc can be removed through mud-holes M² or by other suitable means.

Having now particularly described and ascertained the nature of the said invention and in what manner the same is to be performed, I declare that what I claim is—

1. The process herein described for the purification of zinc for use in the precipitation of precious metals from their solutions, which consists in combining and intimately mixing with granulated or powdered zinc an ammoniacal substance.

2. The process herein described for the recovery of precious metals from their ores, the same consisting in purifying zinc fumes or dust, of oxids, by intimately mixing with the same, an ammoniacal substance, and then mixing a quantity of said fumes or dust, so purified, with the solution.

3. The process herein described for the recovery of precious metals from their ores, the same consisting in purifying the fumes or dust of zinc, of oxids, by the admixture therewith of an ammoniacal substance, and then mixing with the solution a predetermined and regulated quantity of said fumes or dust, so purified.

4. The process herein described for the recovery of precious metals from their ores, which consists in purifying the fumes or dust of zinc, of oxids, by the admixture therewith of an ammoniacal substance, then mixing or combining with the solution a quantity of such fumes or dust, so purified, and agitating the mixture, and finally precipitating or depositing the metals from the solution.

5. The combination of the vessel A, provided at its lower end with a suitable pocket closed by valves, a channel leading from said pocket, a vessel into which said channel leads, means for operating the valves, a supply-tank, delivering the precious metals to said channel, and means for depositing the metals from their solutions, substantially as and for the purpose described.

In testimony whereof I have hereto set my hand in the presence of the two subscribing witnesses.

HENRY LIVINGSTONE SULMAN.

Witnesses:
HAROLD WADE,
T. F. BARNES.